United States Patent [19]
Kwatonowski

[11] 3,895,409
[45] July 22, 1975

[54] SPACER GROMMET AND METHOD OF MANUFACTURE THEREOF

[75] Inventor: Frank Kwatonowski, Somerville, N.J.

[73] Assignee: Johns-Manville Corporation, Denver, Colo.

[22] Filed: Aug. 31, 1973

[21] Appl. No.: 393,372

[52] U.S. Cl. .................... 16/2; 29/512; 29/523
[51] Int. Cl. .................................... B65d 7/48
[58] Field of Search ............ 16/2, 108; 24/141, 142; 85/32.1; 174/83, 152 R, 152 G, 153 R, 153 G, 154, 167; 285/120, 213; 308/237 R; 29/512, 523; 10/27 PH; 72/379

[56] References Cited
UNITED STATES PATENTS
| | | | |
|---|---|---|---|
| 1,688,762 | 10/1928 | Steenstrup | 16/108 X |
| 2,039,386 | 5/1936 | Borst | 16/2 X |

FOREIGN PATENTS OR APPLICATIONS
| | | | |
|---|---|---|---|
| 1,081,675 | 8/1967 | United Kingdom | 16/2 |

*Primary Examiner*—Richard J. Scanlan, Jr.
*Attorney, Agent, or Firm*—Robert M. Krone; James W. McClain

[57] ABSTRACT

A spacer grommet composed of a plurality of layers is disclosed. The spacer grommet is formed by the convolute winding of an elongated strip of material, usually sheet metal. The shoulder portions are formed from multiple layers of rock, flanges, or axial corrugations. A method of fabrication of the spacer grommet is also disclosed.

12 Claims, 16 Drawing Figures

"SPIRAL WOUND"

"CORRUGATED"

PATENTED JUL 22 1975　3,895,409

SHEET 2

"FLANGED"

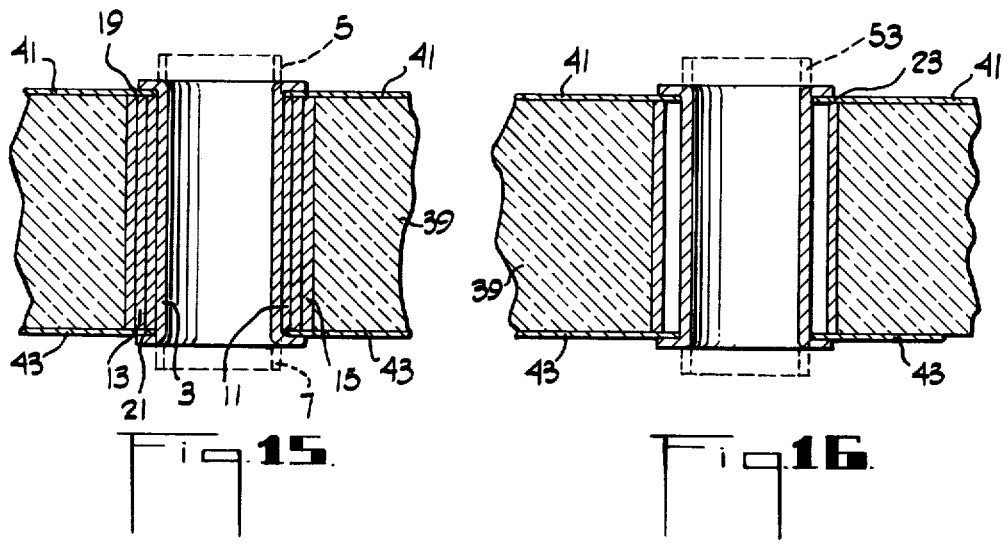

3,895,409

SPACER GROMMET AND METHOD OF MANUFACTURE THEREOF

BACKGROUND OF THE INVENTION

1. Field of the Invention

The invention herein relates to spacer grommets and the manufacture thereof. More particularly it relates to spacer grommets useful in insulation blankets.

fibrous insulation, such as insulation made of mineral fibers, glass fibers, synthetic ceramic fibers and the like, is often manufactured in the form of mats or blankets. These are covered with an outer cover layer, such as a metal foil or facing on each side of the blanket or mat. The covered blanket is then used for thermal insulation of aircraft, automobiles, jet and diesel engines, pipes, reaction vessels and in many other applications where conservation of heat is required.

In many instances it is desirable or required that the thermal insulation blankets have openings therethrough. These may be to permit the use of attaching means to hold the blanket in the desired position on the insulated structure. For instance, the insulation may be laid over projecting lugs, bolts, hooks or the like or it may be desired to have some strapping means attached to the blanket. Openings may also be required to provide access to portions of the underlying insulated structure. In addition, fittings, sample taps and the like may have to project through the insulation blanket. Because the insulation is rated at a specified thickness, however, the various attachment means connecting with these openings, and the other applications of the openings, cannot be permitted to permit compression of the insulating blanket to any significant degree. For this reason it has been the practice in the industry to line the openings with metallic spacer grommets. A typical grommet of the prior art is shown in FIG. 1. The construction of this grommet will be described in detail below, but for the present discussion attention is directed particularly to the two flanges disposed near each end of the cylindrical grommet. These flanges are spaced apart at a distance essentially equal to the thickness of the insulating blanket. When the outer ends of the grommet are crimped over to hold the insulation cover sheets in place, these flanges retain their axial spacing and thus prevent compression of the insulating blanket. Thus, as compared to the conventional grommet which is attached to a perforated sheet material by compressing the sheet itself, the spacer grommet maintains a specified thickness of the blanket to which it is attached while yet serving the protective function of a grommet.

2. Description of Prior Art

Spacer grommets of the type illustrated in FIG. 1 have previously been used commercially. As is illustrated in FIG. 1, such spacer grommets have consisted of a solid unitary block of material. It had been conventional to construct such prior art spacer grommets by machining a length of bar or round stock to the internal and external configuration shown in FIG. 1. As will be evident, this has resulted in much waste of stock. Further, since such spacer grommets are normally manufactured in small quantities (because most insulating blanket production requires few grommets and no standard sizes are recognized), the effective cost of each individual spacer grommet has been extraordinarily high. Thus, it would be highly desirable to have a spacer grommet which can be readily fabricated in small quantities economically and with little or no waste of valuable stock materials. In addition, spacer grommets machined from bar or rod stock are quite heavy, which is a serious disadvantage when used with insulation blankets in aircraft. Lighter weight but equally strong spacer grommets would be very desirable in such applications.

OBJECTS OF THE INVENTION

It is therefore an object of this invention to describe a spacer grommet which can be readily fabricated from common sheet material without the use of complex machining steps.

It is also an object of this invention to describe a spacer grommet which can be made readily available in small quantities and widely varying sizes.

It is further an object of this invention to describe a spacer grommet which may be readily produced in a variety of configurations.

It is further an object of this invention to describe a method for producing spacer grommets economically in small quantities and in varying sizes.

It is also an object of this invention to provide a strong, light weight spacer grommet for use in aircraft insulation.

BRIEF DESCRIPTION OF THE DRAWINGS

FIG. 8 illustrates the original piece of sheet stock, FIG. 9 illustrates the stock at a subsequent stage of formation of the grommet, FIG. 10 is a pictorial view partially cut away of the finished grommet, and FIGS. 11 and 12 are cross-sections taken respectively on planes 11—11 and 12—12 of FIG. 10.

FIGS. 15 and 16 are similar to FIG. 13, and illustrate attachment of the spacer grommets of FIGS. 3 and 6, respectively, to insulating blankets.

BRIEF SUMMARY OF THE INVENTION

Figure 1:
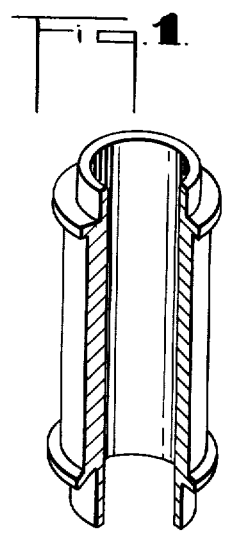
FIG. 1, as described above, illustrates a typical spacer grommet of the prior art which is composed of a single solid block of metal machined (as by drilling and turning) from a solid segment of rod or bar stock.

The invention herein is a spacer grommet comprising a single strip of sheet material and having: a core composed of at least one layer of the sheet material, with the core surrounding the axis of and defining an axial opening through the spacer grommet; a spacer segment composed of at least one layer of the sheet material, with the spacer segment being disposed radially outwardly from and adjacent to the core and cooperating with the core to form a shoulder at each axial end of the spacer segment; and the core having at each axial end thereof a locking portion, each locking portion extending axially beyond the corresponding shoulder of the spacer segment, the amount of extension being such that the locking portion when turned radially outwardly will cooperate with the corresponding shoulder and retain the spacer grommet in its operative position.

The invention herein also includes several embodiments of the spacer grommet in which the shoulder is provided by a flange, a multiple layer of stock material, or a corrugated irregular layer of sheet material.

The invention also encompasses a method of forming a multi-layer spacer grommet having a core and spacer segment from a single strip of sheet material which comprises forming an elongate strip of sheet material having at one end thereof a core forming section with a length approximately equal to the circumference of the core of the spacer grommet, and at the other end thereof a spacer segment forming section having a length at least approximately equal to the circumference of the first annular layer radially outward from and adjacent to the core; and convolutely winding the elongate strip about a mandrel to form the spacer grommet, the mandrel having an outer diameter equal to the inner diameter of the spacer grommet. The method may further comprise an additional step of securing the outer spacer segment in a fixed position relative to the core after convolute winding. The method may further comprise the additional steps of forming transverse corrugations or longitudinal flanges in the spacer segment forming section of the strip of sheet material prior to convolute winding.

DETAILED DESCRIPTION AND PREFERRED EMBODIMENTS

The invention herein is best understood by reference to the attached drawings. Several of the figures are grouped to illustrate three embodiments of the spacer grommet and method of manufacture of this invention. For brevity and ease of reference, these will be termed respectively the "spiral wound," "corrugated" and "flanged" embodiments. These adjectives are intended to serve merely as convenient labels, however, and are not intended in any way to limit the scope of the invention by excluding other embodiments which are not so labeled. In the drawings, FIGS. 2–4 and 15 relate to the spiral wound embodiment, FIGS. 5–7 and 16 relate to the corrugated embodiment, and FIGS. 8–14 relate to the flanged embodiment.

Figure 2:
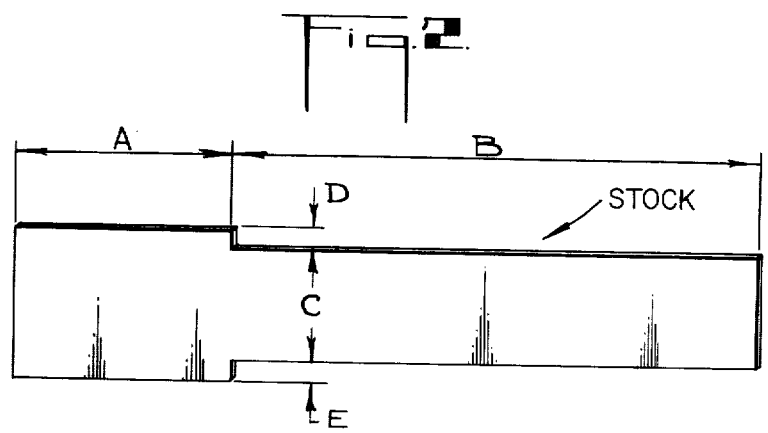
FIGS. 2, 3 and 4 illustrate one embodiment of the present invention, in which a single strip of stock (FIG. 2) is convolutely wrapped to form a multi-layer spacer grommet (FIG. 3) which appears as a spiral in end view (FIG. 4).

Considering first the spiral wound embodiment, FIG. 2 illustrates a typical single piece of sheet material or stock from which the multi-layer spacer grommet is formed. This strip of stock material is generally elongated in the length or longitudinal direction as compared to the axial or width direction. The thickness is considerably less than either of the other two dimensions. This strip will normally be sheared, stamped or otherwise cut from a sheet or roll of sheet metal, such as aluminum, steel, stainless steel, copper, titanium or other sheet metal. The thickness will therefore normally be one of the conventional sheet metal gauge thicknesses. Suitable thicknesses herein will range from 0.006 to 0.050 inches with the stronger, stiffer or more rigid metals being used when the application requires a stronger grommet. The particular gauge or thickness used will depend on a number of factors, including the size of the desired spacer grommet, the service to which it is to be applied, the distending forces to which will be subjected in service and the intended fabricating method. The material must have sufficient strength, stiffness or rigidity (which are all defined herein to mean resistance to compression) to resist compressive forces applied axially to the formed spacer grommet. It must however have sufficient ductility or bendability such that the axial ends of the spacer grommet may be bent or crimped over to lock the spacer grommet into its operative position on the insulation blanket. A variety of different materials, generally common sheet metals such as those mentioned above, are quite suitable for use in these multi-layer spacer grommets, and it is well within the ability of those skilled in the art to readily determine the appropriate gauge or thickness for any particular service.

Figure 14:
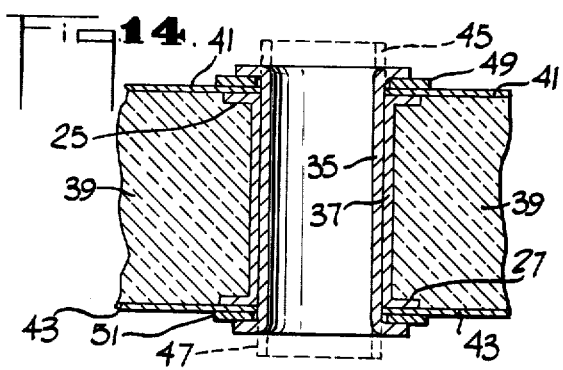

FIG. 2 also illustrates graphically the dimensioning of the strip of stock. The more critical dimensions are those related to width, and designated C, D and E in FIG. 2. Dimension C is essentially equal to the width of the blanket of insulation but excludes the thickness dimensions of the overlying and underlying blanket covers of foil or similar material. Dimensions D and E indicate the extensions of the core which provide the locking portion to be crimped or bent over to hold the spacer grommet in operative position. Commonly, D and E will be equal dimensions, but they may be unequal if a longer extension is desired at one end that at the other. This could occur for instance where a heavier gauge foil is used on one side of the blanket than on the other, or where it is considered desirable to incorporate a washer into the locking configuration (as shown in FIG. 14) at one end of the spacer grommet but not at the other. In FIG. 2, dimension C is shown as constant throughout the length B. This represents the simplest and most economical configuration. It would be possible however to have the dimension C vary over the length B as long as it does not exceed the desired thickness of the insulation blanket, but such variation complicates the manufacturing process without any significant improvement in the finished spacer grommet and is therefore not preferred.

The length dimensions A and B are related to the final configuration of the finished spacer grommet. Length A is generally about equal to the circumference of the core of the spacer grommet. This hollow core defines the axial opening through the grommet and will be determined by the service in which the grommet is put. While it is most economical that the length dimension A be approximately equal to the circumference of the core, so that the core comprises but a single layer of the multi-layer grommet, it is also within the scope of this invention to have the dimension A be in excess of a single circumference, so that the core of the grommet comprises more than one layer of the multi-layer grommet. Such a multi-layer core might be desirable where for instance the only available sheet stock was of an undesirably light gauge and more than one layer was required to obtain suitable rigidity. The multi-layer configuration of the core also encompasses partial layers, as, for example, where it is contemplated that in service the strain imparted will all be against one side of the grommet and it is desired to strengthen that side without adding unnecessary layers of material to other portions of the grommet. The invention herein also contemplates that the dimension A might be slightly less than one full circumference of the core of the spacer grommet so that the layer of the core is not quite closed in a 36D° circle. However, any such lack of closure must be very slight and it is in fact preferred that the dimension A be slightly greater than one circumference so that a small overlap occurs, as illustrated at 2 in FIGS. 3 and 4.

Figure 3:
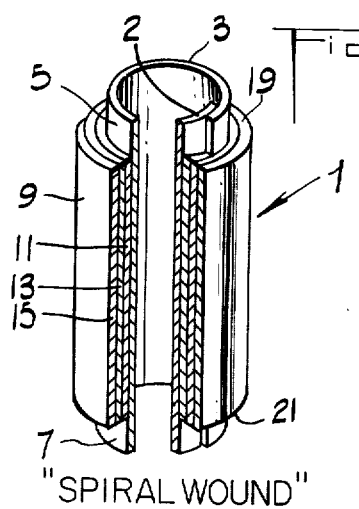
Figure 4:
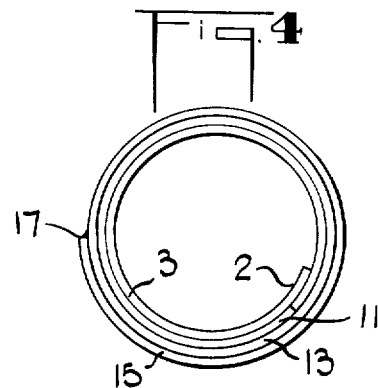

The dimension B will be equal to at least one circumference of the first annular layer of material radially outwardly of and adjacent to the core. More particularly in the spiral wound configuration, dimension B will be equal to two, three or more circumferences of the spacer grommet and will be formed into an equivalent number of layers of convolutely wound material, to produce the multi-layer configuration of the spacer grommet. A typical configuration is illustrated in FIGS. 3 and 4 with a single but overlapping core layer and approximately two and one-half spacer layers. As will be discussed below, the dimension A will remain essentially constant throughout the various embodiments, while the dimension B will vary according to the particular embodient being considered.

A pictorial representation of the spiral wound embodiment is shown in FIG. 3 and designated generally 1. The core section is designated 3 with the extensions thereof designated respectively 5 and 7. The spacer segment is designated 9 and in the particular embodiment shown is composed of adjacent and overlapping layers 11, 13 and 15. An end view of this configuration is illustrated in FIG. 4. Also shown in FIG. 4 is means for holding the spiral wound configuration in a fixed relationship of spacer segment to core. In the embodiment shown, this comprises a spot weld 17 at the terminal end of the convolutely wound spacer segment, which prevents the spacer grommet from uncoiling. Other means of securing the spacer segment and core in a fixed relationship will be immediately evident. Typical examples would include a layer of adhesive placed between layers 13 and 15 of the sheet strip or a narrow belt of elastic tape or strap-like material wrapped around the center of the cylindrical grommet and self-secured. In certain configurations the convolutely wound spacer grommet may have a self-retaining shape and the separate securing means such as spot weld 17 might not be necessary. However, it is preferred that such securing means be incorporated to add a margin of safety and to provide a positive restraint against accidental partial or complete uncoiling.

As illustrated in FIG. 3 in the spiral wound configuration, the shoulders 19 and 21 upon which the foil cover of the insulating blanket rests are formed by the outer transverse edges of the adjacent layers of strip material. Thus, additional layers of material convolutely wrapped around the core will provide increasingly wider shoulders for support of the foil covers and a successively greater base against which the core extensions 5 and 7 can be crimped to provide securing of the grommet to the insulation blanket.

Figure 5:
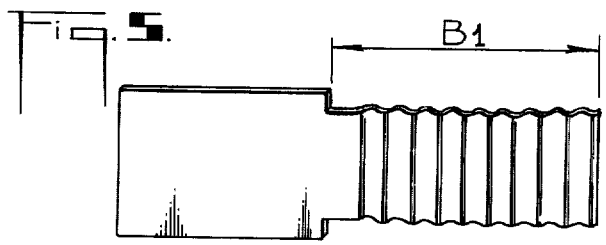
FIGS. 5, 6 and 7 illustrate a second embodiment of the invention in which a single strip of stock which has been partially corrugated (FIG. 5) is convolutely wrapped to form a spacer grommet (shown in partial pictorial view in FIG. 6) which presents the appearance in end view of an inner spiral and circumscribed thereabout an irregular or spar shaped annulus (FIG. 7).
Figure 6:
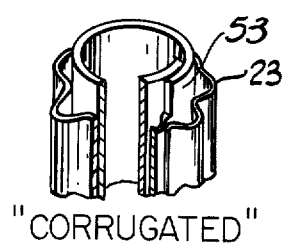
Figure 7:
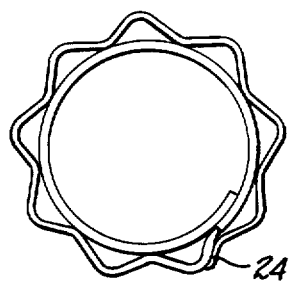

A second configuration is illustrated in FIGS. 5-7 and is designated the corrugated configuration. In this configuration the spacer segment forming section of the sheet stock is provided with a series of transverse corrugations. The depth of these corrugations will determine the width of the support shoulder 23 in this particular configuration. As in the spiral wound configuration, the core preferably consists of one layer with a slight overlap. The spacer segment then consists of a single annulus surrounding the core, as illustrated in FIG. 6 and the axial end view thereof shown in FIG. 7. The corrugations are most readily made regular, but need not be; an irregular pattern of corrugations would be quite satisfactory providing that the degree of irregularity was not such as to eliminate substantial shoulder segments and thus leave the foil blanket cover with substantial regions of insufficient locking attachment to the spacer grommet. Regardless of the type or degree of corrugations, the dimension $B_1$ in FIG. 5 will be equivalent to approximately one annulus around the core, with some small variation permissible to allow either a small area of non-closure or a small degree of overlap, as illustrated at 24 in FIG. 7. There may if desired be more than one layer of the corrugated spacer segment, but this is not preferred because of the difficulty of obtaining a satisfactory match of corresponding corrugations. If additional rigidity is required, it is preferred to retain a single layer of corrugations but to space the corrugations more closely together.

Figure 8:
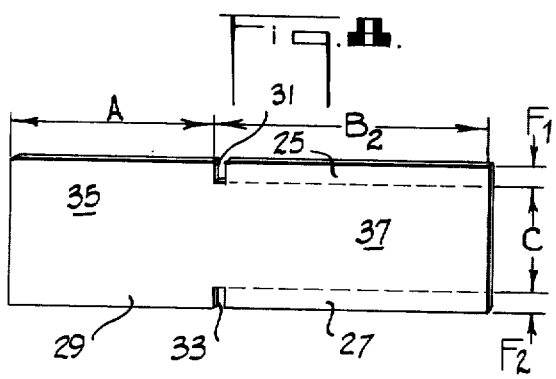
FIGS. 8–12 illustrate yet another embodiment of the invention, in which a single piece of stock is formed into a multi-layer spacer grommet having flanges thereon.
Figure 9:
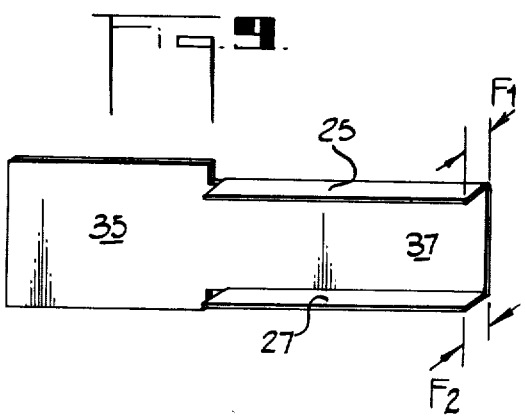
Figure 10:
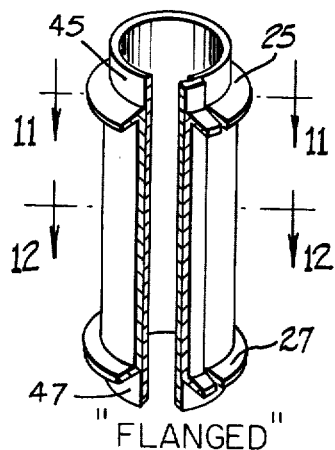
Figures 11, 12:

A third embodiment of the invention is designated the flanged embodiment and illustrated in FIGS. 8-12. This configuration is illustrated pictorially in FIG. 10 wherein it is seen that the support shoulders are provided by flanges 25 and 27. The method of fabrication of this embodiment is illustrated in FIGS. 8 and 9. Stock strip 29 is notched at 31 and 33 to separate the strip into core forming section 35 with the length dimension A equal, as discussed above, to slightly more than one circumference of the core, and spacer segment forming section 37 with the length dimension $B_2$. $B_2$ will be equal to or slightly less than the circumference of the first annular layer radially outwardly of and adjacent to the core. Notches 31 and 33 will be cut to a depth such that they are separated transversely by an uncut portion of stock having width C, the desired thickness of the insulating blanket. The depth $F_1$ of notch 31 and $F_2$ of notch 33 will then define the width of flanges 25 and 27 respectively. In the embodiment shown in FIGS. 8 and 9, dimensions $F_1$ and $F_2$ are approximately equal and the overall sum of dimensions C, $F_1$ and $F_2$ equals the width of core forming section 35. This is not required, however, and varying widths of flanges 25 and/or 27 may be obtained by beginning with an appropriately shaped piece of stock in which the width of core forming section 35 is not equal to the width of spacer segment forming section 37. notches addition, sotches 31 and 33 may be of unequal depth so that the dimension $F_1$ and $F_2$ are unequal. The configuration shown in FIGS. 8 and 9 is preferred, however, with the substantial equality of dimensions $F_1$ and $F_2$ and overall equal width of the starting stock, for this is the simplest and most economical configuration and one which will normally be entirely satisfactory in service.

Following notching of the stock 29 flanges 25 and 27 are bent at essentially right angles to the strip of stock as shown in FIG. 9. The stock is then bent around a mandrel so that flanges 25 and 27 project radially outwardly from their abutment with the core. The final configuration is shown in cross-section in FIGS. 11 and 12, the former being a cross-section through flange 25 and the latter a cross-section through a mid point of the spacer segment. If necessary because of the small diameter grommet desired, the width of flange desired, and-/or the stiffness of the metal being used, it may be desirable to cut notches into flanges 25 and 27 at various points along their length to facilitate the convolute winding thereof. In addition, as with the other two embodiments described above, it may be desirable to provide a positive securing means such as a spot weld to retain the spacer segment and core in a fixed relationship.

The general method of manufacture of the spacer grommet of this invention involves two steps. In the first step the stock is formed in its generally elongate shape as in FIG. 2 and then, where appropriate, further worked to provide the flanges shown in FIG. 9 or the corrugations shown in FIG. 5. Conventional sheet metal working apparatus is entirely suitable for such forming operation. The formed stock is thereafter convolutely wound around a mandrel to obtain the operative shape of the spacer grommet. In the attached drawings the embodiments have been shown as cylindrical. However, by use of an appropriate mandrel, square, hexagonal, octagonal or other polygonal configurations may be obtained. Similarly oval, elliptical or irregularly curved shapes may also be obtained by use of appropriate mandrels. Consequently, where in this specification term "diameter" or "annulus" is used it is to be understood that these terms also include the corresponding dimension or shape appropriate to the particular cross-section concerned. Similarly, while as to cylindrical grommets the term "convolute winding" is used with its conventional meaning, it is also intended that the term encompass the eqivalent winding or coiling of a non-cylindrical shape. It is preferred however that the grommets of this invention be cylindrical for no particular advantage is generally obtained by resorting to a more exotic cross-sectional shape.

The forming mandrel used to produce the grommets of this invention may be any conventional type of mandrel or mandrel equivalent. Thus, a power driven radially rotating rod could be used either in a separate machine or as a forming rod chucked into a rotating head of a device such as a drill press. Similarly, the grommet could be formed by being bent around a hand-held rod or elongated tool.

Figure 13:
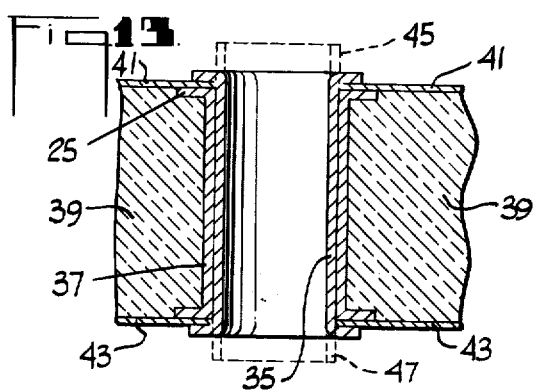
FIGS. 13 and 14 are axial cross-sectional views of the grommet of FIG. 10, illustrating two alternate means of attaching the spacer grommets to an insulating blanket.

Cross-sectional views of the grommet of this invention in service are shown in FIGS. 13–16. In each view the insulating blanket is designated 39 and the foil covers designated 41 and 43. FIGS. 13 and 14 illustrate the flanged embodiment of the spacer grommet invention. Core layer 35 and spacer segment layer 37 as well as flanges 25 and 27 are shown in axial cross-section. The spacer grommet is inserted through a hole cut in the insulation blanket and the foil covers. The hole cut through the blanket will have a diameter equal to or greater than the greatest outside diameter of the spacer grommet. (If the blanket is somewhat resilient, it may expand to fill any free space remaining after the grommet is inserted, as illustrated by FIGS. 13 and 14.) The hole cut in foil covers will be essentially equal to the outside diameter of the core, although it may be slightly larger if the core extensions are large or the washer embodiment described below is used. Core extensions 45 and 47 are shown designated on FIG. 10 and in phantom in FIGS. 13 and 14. In FIG. 13 these extensions are shown bent down to cooperate with respectively flanges 25 and 27 to lock therebetween respectively foil covers 41 and 43 and retain the spacer grommets in its operative position. In the embodiment shown in FIG. 14, washers 49 and 51 are placed over extensions 45 and 47 following placement of foil covers 41 and 43. Extensions 45 and 47 are then bent down into engagement with respectively washers 49 and 51, thus locking foil covers 41 and 43 in position. This embodiment is preferred where foil covers 41 and 43 are of very light gauge and might be subject to tearing or other damage by being contacted directly by the edges of the core extensions 45 and 47.

FIG. 15 illustrates an axial cross-section of the spiral wound embodiment of FIG. 3 in place. In this view it is clearly seen how layers 11, 13 and 15 form shoulders 19 and 21 which cooperate respectively with core extensions 5 and 7 to lock foil layers 41 and 43 in position. Similarly, in FIG. 16 it will be seen that the corrugations form upper shoulder 23 which cooperate with core extension 53 to lock the foil cover 41 in place; a similar shoulder-and-extension lock is formed at the lower end.

What is claimed is:
1. A spacer grommet comprising a single strip of sheet material and having
   a. a core composed of at least one layer of said sheet material, said core surrounding the axis of and defining an axial opening through said spacer grommet;
   b. a spacer segment composed of at least one layer of said sheet material, said spacer segment
      i. being disposed radially outwardly from and adjacent to said core; axial
      ii. cooperating with said core to form a shoulder at each axis end of said segment; and
   c. said core having at each axial end thereof a locking portion, each locking portion extending axially beyond the corresponding shoulder of said spacer segment, the amount of extension being such that said locking portion when turned radially outwardly will cooperate with said shoulder to retain said spacer grommet in its operative position.

2. The spacer grommet of claim 1 further comprising means for securing said spacer segment and said core in a fixed radial configuration.

3. The spacer grommet of claim 2 wherein said means comprises at least one spot weld at the terminal point of said single strip of material at the radially outward extremity of said spacer segment.

4. The spacer grommet of claim 1 wherein said core comprises essentially a single layer of said sheet material.

5. The spacer grommet of claim 1 wherein said spacer segment comprises a single layer of said sheet material and is disposed immediately adjacent to and in contact with said core.

6. The spacer grommet of claim 5 wherein each of said shoulders of said spacer segment comprises a flange extending radially outwardly at an axial extremity of said spacer segment.

7. The spacer grommet of claim 5 wherein said spacer segment contains axial corrugations.

8. The spacer grommet of claim 1 wherein said spacer segment comprises a plurality of layers of said sheet material.

9. The spacer grommet of claim 8 wherein the radial cross-section is a spiral.

10. The spacer grommet of claim 5 wherein the amount of extension of each of said locking portions is approximately equal to the radial width of the corresponding flange of said spacer segment.

11. A method of forming a multi-layer spacer having a core and spacer segment from a single strip of sheet material which comprises a. forming an elongate strip of sheet material having at one end thereof a core-forming section having a length at least approximately equal to the circumference of the core of the spacer grommet, and at the other end thereof a spacer segment forming section having a length at least approximately equal to the circumference of the first annular layer radially outwardly from and adjacent to said core,
  b. imparting transverse corrugations to said spacer segment forming section; and
  c. convolutely winding said elongate strip about a mandrel to form the spacer grommet, said mandrel having an outer diameter approximately equal to the inner diameter of said spacer grommet.

12. A method of forming a multi-layer spacer having a core and spacer segment from a single strip of sheet material which comprises a. forming an elongate strip of sheet material having at one end thereof a core-forming section having a length at least approximately equal to the circumference of the core of the spacer grommet, and at the other end thereof a spacer segment forming section having a length at least approximately equal to the circumference of the first annular layer radially outwardly from and adjacent to said core,
  b. forming a flange at each transverse extremity of said spacer segment forming section; and
  c. convolutely winding said elongate strip about a mandrel to form the spacer grommet, said mandrel having an outer diameter approximately equal to the inner diameter of said spacer grommet.

* * * * *

UNITED STATES PATENT AND TRADEMARK OFFICE
CERTIFICATE OF CORRECTION

PATENT NO. : 3,895,409
DATED : 7/22/75
INVENTOR(S) : Frank Kwatonowski

It is certified that error appears in the above-identified patent and that said Letters Patent are hereby corrected as shown below:

In the ABSTRACT line 5, "rock" should read --stock--

Column 1, line 9, "fibrous" is the beginning of a new paragraph and should be capitolized.

Column 4, line 30, "that" should read --than--

Column 5, line 4, "36D°" should read --360°--

Column 5, line 23, "embodient" should read --embodiment--

Column 6, lines 48 and 49 "notches addition, sotches" should read -- In addition, notches--

Column 8, line 28 Claim 1 (bi) "axial" should read --and--

Column 8, line 31 Claim 1 (bii) "axis" should read --axial--

Signed and Sealed this twenty-first Day of October 1975

[SEAL]

Attest:

RUTH C. MASON
*Attesting Officer*

C. MARSHALL DANN
*Commissioner of Patents and Trademarks*